United States Patent
Barker et al.

(10) Patent No.: US 12,096,726 B2
(45) Date of Patent: Sep. 24, 2024

(54) IRRIGATION CONTROL PANEL WITH ELECTROPHORETIC INDICATOR

(71) Applicant: LINDSAY CORPORATION, Omaha, NE (US)

(72) Inventors: Luke Joseph Barker, Omaha, NE (US); Mark William Miller, Elkhorn, NE (US)

(73) Assignee: Lindsay Corporation, Omaha, NE (US)

( * ) Notice: Subject to any disclaimer, the term of this patent is extended or adjusted under 35 U.S.C. 154(b) by 751 days.

(21) Appl. No.: 17/198,484

(22) Filed: Mar. 11, 2021

(65) Prior Publication Data

US 2022/0287254 A1 Sep. 15, 2022

(51) Int. Cl.
*A01G 25/16* (2006.01)
*A01G 25/09* (2006.01)

(52) U.S. Cl.
CPC ......... *A01G 25/167* (2013.01); *A01G 25/092* (2013.01)

(58) Field of Classification Search
CPC .... A01G 25/167; A01G 25/092; A01G 25/16; A01G 25/09; A01G 25/165; A01G 25/162
See application file for complete search history.

(56) References Cited

U.S. PATENT DOCUMENTS

| 8,244,404 | B2 | 8/2012 | Nickerson |
| 9,746,859 | B2 | 8/2017 | Conner et al. |
| 9,829,871 | B1 * | 11/2017 | Goodman ............ A01G 25/167 |
| 10,419,902 | B1 * | 9/2019 | Naspolini .............. A01D 91/00 |
| 2002/0066810 | A1 * | 6/2002 | Prandi .................... A01G 25/16 239/69 |
| 2006/0027677 | A1 | 2/2006 | Abts |
| 2011/0148750 | A1 | 6/2011 | Ayala |
| 2019/0221395 | A1 | 7/2019 | Hendrixson, III et al. |
| 2020/0098214 | A1 | 3/2020 | Geerlings et al. |
| 2020/0232653 | A1 | 7/2020 | Clifton et al. |
| 2020/0253140 | A1 | 8/2020 | Larsen |
| 2020/0274929 | A1 | 8/2020 | Binder et al. |
| 2020/0356119 | A1 | 11/2020 | Javey |

FOREIGN PATENT DOCUMENTS

KR 10-1505888 B1 3/2015

OTHER PUBLICATIONS

International Search Report and Written Opinion in related PCT application No. PCT/US2022/015487, mailed May 13, 2022, 11 pages.

* cited by examiner

*Primary Examiner* — Christopher R Dandridge
(74) *Attorney, Agent, or Firm* — HOVEY WILLIAMS LLP (57) ABSTRACT

An irrigation control panel, an irrigation system, and a method of monitoring operations of the irrigation system are provided. The irrigation control panel comprises a display and a processing element. The display comprises an electrophoretic portion. The processing element is configured to determine an operating condition of the irrigation system, and display an indication representative of the operating condition on the electrophoretic portion so that the indication representative of the operating condition displayed on the electrophoretic portion persists after disconnecting power.

18 Claims, 3 Drawing Sheets

IRRIGATION CONTROL PANEL WITH ELECTROPHORETIC INDICATOR

BACKGROUND

Restarting an irrigation system that was automatically shut off can pose a risk to a technician and/or to components of the irrigation system. Irrigation systems often have control features that cause them to automatically shut down when presented with certain operating conditions, such as a short circuit fault, an overheated motor, or the like. When the technician arrives to assess an irrigation system that has shutoff, the technician often has to guess as to what caused the shutoff. If the technician is wrong and/or cannot figure out why the irrigation shut down, then the technician may be compelled to restart the irrigation system. However, if the operating condition was due to a short circuit, for example, the short circuit could damage the irrigation system or even harm the technician. Current solutions for providing operational information to a technician involve transmitting a signal wirelessly to a remote device indicating the operating condition. However, these signals can often be missed and require expensive communication equipment.

The background discussion is intended to provide information related to the present invention which is not necessarily prior art.

SUMMARY

The present invention solves the above-described problems and other problems by providing irrigation control panels, irrigation systems, and methods of monitoring operations thereof that enable robust communication of operating conditions to a technician so that irrigation systems can be more safely restored after a shutdown.

An irrigation control panel constructed according to an embodiment of the present invention is provided for monitoring operations of an irrigation system. The irrigation control panel comprises a display and a processing element in communication with the display. The display comprises an electrophoretic portion.

The processing element is configured to determine an operating condition of the irrigation system and display an indication representative of the operating condition on the electrophoretic portion so that the indication representative of the operating condition displayed on the electrophoretic portion persists after disconnecting power. By displaying the indication representative of the operating condition on the electrophoretic portion so that it persists after disconnecting power, a technician can readily assess a situation and potentially diagnose a problem without having to turn on the irrigation system. Further, it enables the technician to potentially avoid a dangerous situation, such as a short circuit fault that could injure the technician and/or that could damage equipment.

A computer-implemented method of monitoring operations of an irrigation system according to an embodiment of the present invention broadly comprises determining, via a processing element of an irrigation control panel in communication with the irrigation system, an operating condition of the irrigation system; and displaying, via an electrophoretic portion of a display of the irrigation control panel, an indication representative of the operating condition so that the indication representative of the operating condition displayed on the electrophoretic portion persists after disconnecting power.

An irrigation system constructed according to an embodiment of the present invention broadly comprises a plurality of mobile support towers, a plurality of truss sections, a fluid-carrying conduit, water emitters, at least one valve, and an irrigation control panel. The mobile support towers are configured to move across a field, and one or more of the support towers have a motor. The truss sections extend between the mobile support towers. The fluid-carrying conduit is supported above the field by the truss sections. The water emitters are coupled with the fluid-carrying conduit. The at least one valve controls flow of fluids through the water emitters.

The irrigation control panel is in communication with the at least one valve and the motor and comprises a display and a processing element. The display includes an electrophoretic portion. The processing element is configured to determine an operating condition of the irrigation system and display an indication representative of the operating condition on the electrophoretic portion so that the indication representative of the operating condition displayed on the electrophoretic portion persists after a loss of power to the irrigation system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
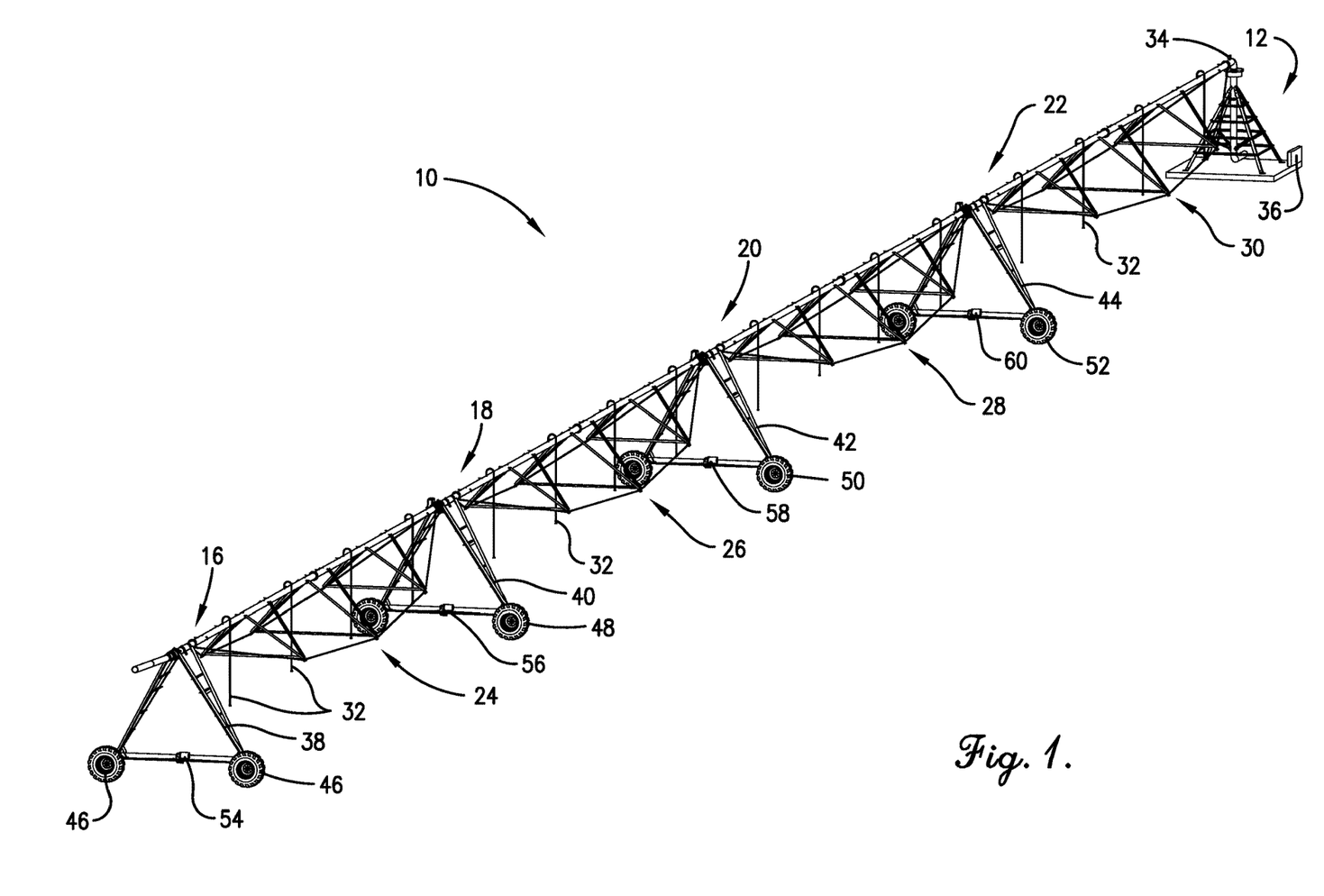
FIG. 1 is a perspective view of an irrigation system constructed in accordance with embodiments of the present invention.

Turning to FIG. 1, an irrigation system 10 constructed in accordance with an embodiment of the invention is illustrated. The illustrated irrigation system 10 is a pivot irrigation system, but can be any other irrigation system, such as a lateral irrigation system. The irrigation system 10 may have access to a hydrant, well, water tank, or other source 12 of water and may also be in fluid communication with a tank or other source of agricultural products to inject fertilizers, pesticides and/or other chemicals into the water for application during irrigation. The irrigation system 10 may also be supplied electrical power from a power source 13 (depicted in FIG. 2), such as a generator, a power line, a transformer, a converter, a circuit breaker junction box, or the like. The power source 13 may have a switch, relay, circuit breaker, or the like, for disconnecting from the irrigation system 10.

The irrigation system 10 may comprise a number of spaced-apart mobile towers 16, 18, 20, 22, a fluid-distribution conduit 14 in fluid communication with the water source 12 and supported by the towers 16, 18, 20, 22 above a field, a plurality of truss sections 24, 26, 28, 30 or other supports to form a number of interconnected spans that help support the conduit 14, a plurality of fluid emitters 32 that are in fluid communication with the conduit 14, one or more valves 34 for controlling flow of fluids to the emitters 32, and an irrigation control panel 36 for monitoring operation of the irrigation system 10.

The mobile towers 16, 18, 20, 22 support the conduit 14 and carry the conduit 14 and emitters 32 across the field. Each mobile tower 16, 18, 20, 22, includes a frame 38, 40, 42, 44 for supporting a portion of the conduit 14 and wheels 46, 48, 50, 52 rotatably attached to the frame 38, 40, 42, 44. One or more of the towers 16, 18, 20, 22 may include a motor 54, 56, 58, 60 for driving the wheels 46, 48, 50, 52 of its respective tower 16, 18, 20, 22.

The conduit 14 spans across the irrigation system 10 and carries water and/or other fluids to the emitters 32. The conduit 14 may comprise piping, one or more hoses, or the like. Water and/or other fluids may travel from the water source 12 to the conduit 14, which directs them to the emitters 32.

The fluid emitters 32 apply the water and/or other fluids transported by the conduit 14 to the crops and/or soil beneath the conduit 14. The fluid emitters 32 are spaced along the truss sections 24, 26, 28, 30 and may include a plurality of sprayer heads, sprinkler drops, spray guns, drop nozzles, valves, and/or other devices.

The one or more valves 34 control flow of water and/or other fluids through the emitters 32. The valves 34 may be controllable via one or more actuators, such as pneumatic actuator, hydraulic actuators, mechanical actuators, solenoid-type actuators, or the like. The valves 34 may be binary, in that they only shut on or off, and/or the valves 34 may adjust a flow rate of the water and/or other fluids flowing through the conduit 14 and/or the emitters 32. The irrigation system 10 may comprise only one valve 34 that controls the flow of water and/or other fluids to/through the conduit 14. The irrigation system 10 may alternatively or additionally comprise a plurality of valves 34 for such control. For example, a valve 34 may be in fluid communication with each emitter 32 so that the valve 34 controls the flow of water and/or other fluids through its corresponding emitter 32.

Figure 2:
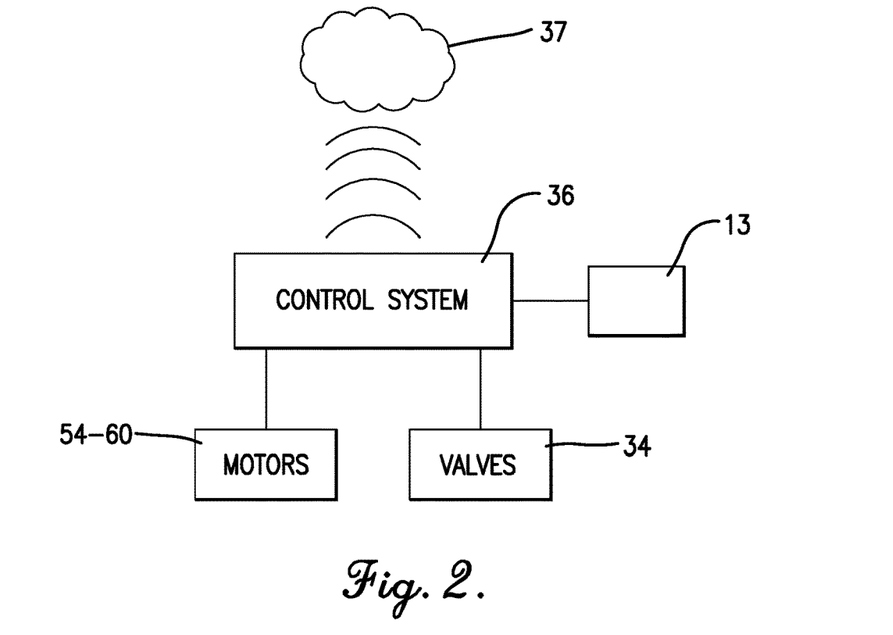
FIG. 2 is a block diagram depicting selected components of the irrigation system of FIG. 1.

The irrigation control panel 36 is configured to monitor operations of the irrigation system 10. In some embodiments, the irrigation control panel 36 may be configured to connect and/or disconnect the irrigation system 10 from the power source 13. The irrigation control panel 36 may also be configured to selectively supply power to one or more of the irrigation system 10 components, such as the motors or valves. The irrigation control panel 36 may be mounted on one of the towers 16, 18, 20, 22, on a platform connected to the towers (such as at the water source 12), and/or at a nearby irrigation system station or junction box. Turning to FIG. 2, the irrigation control panel 36 may be in communication with the power source 13, the motors 54, 56, 58, 60, the valves 34, and/or one or more external devices 37, such as network devices, the cloud, servers, computers, smart phones, communications equipment, a satellite, or the like. In some embodiments, the irrigation control panel 36 is electrically connected to the power source 13 so that it receives power from the source 13. The irrigation control panel 36 may also be configured to distribute the power from the source 13 to other components in the irrigation system 10. Alternatively or additionally, the irrigation control panel 36 may be configured to monitor the power from the source 13.

Figure 3:
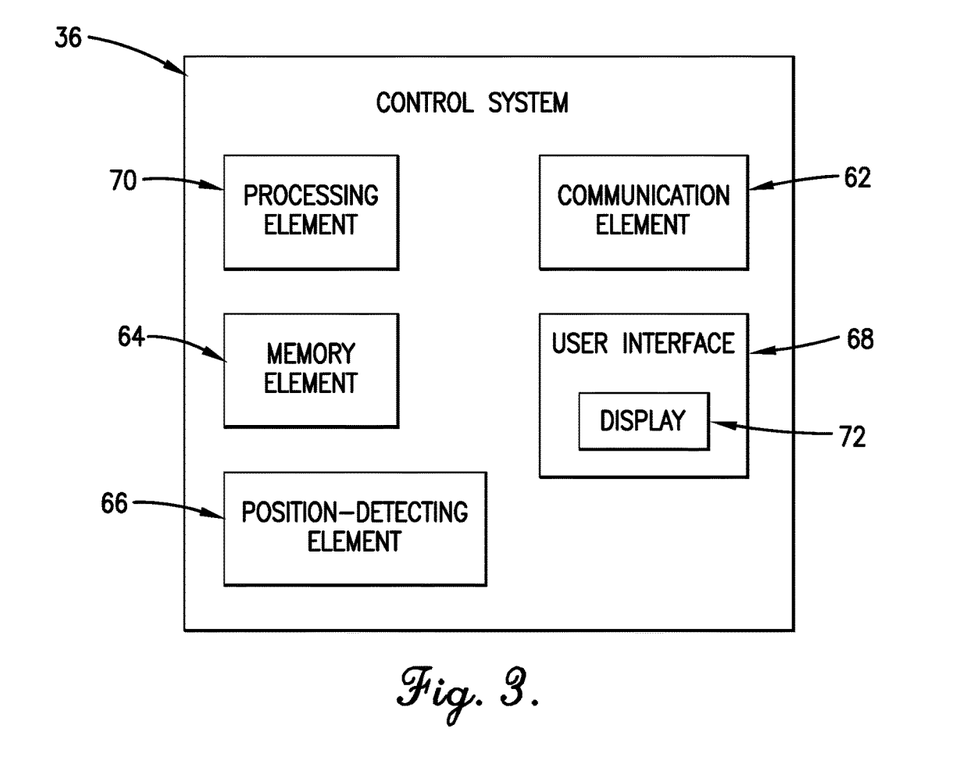
FIG. 3 is a block diagram depicting selected components of an irrigation control panel of the irrigation system of FIG. 1.

The irrigation control panel 36 may comprise a communication element 62, a memory element 64, a position-detecting device 66, a user interface 68, and a processing element 70. The communication element 62 may generally allow communication with systems or devices external to the irrigation control panel 36. The communication element 62 may include signal or data transmitting and receiving circuits, such as antennas, amplifiers, filters, mixers, oscillators, digital signal processors (DSPs), and the like. The communication element 62 may establish communication wirelessly by utilizing RF signals and/or data that comply with communication standards such as cellular 2G, 3G, 4G, 5G, or LTE, WiFi, WiMAX, Bluetooth®, BLE, or combinations thereof. The communication element 62 may be in communication with the processing element 70 and the memory element 64.

The memory element 64 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 64 may be embedded in, or packaged in the same package as, the processing element 70. The memory element 64 may include, or may constitute, a "computer-readable medium". The memory element 64 may store the instructions, code, code segments, software, firmware, programs, applications, apps, services, daemons, or the like that are executed by the processing element 70.

The position-detection device 66 is configured to collect data for determining a position of a portion of the irrigation system 10. The position-detection device 66 may comprise a global positioning system (GPS) device and/or real-time kinematic (RTK) technology for determining a position of the portion of the irrigation system 10. For example, the position-detection device 66 may be positioned with the rest of the components of the irrigation control panel 36 or positioned on, for example, one of the truss sections 24, 26, 28, 30 or mobile towers 16, 18, 20, 22.

The user interface 68 generally allows the user to utilize inputs and outputs to interact with the irrigation control panel 36 and is in communication with the processing element 70. Inputs may include buttons, pushbuttons, knobs, jog dials, shuttle dials, directional pads, multidirectional buttons, switches, keypads, keyboards, mice, joysticks, microphones, or the like, or combinations thereof. The outputs of the present invention include a display 72 but may include any number of additional outputs, such as audio speakers, lights, dials, meters, printers, or the like, or combinations thereof, without departing from the scope of the present invention.

Figure 4:
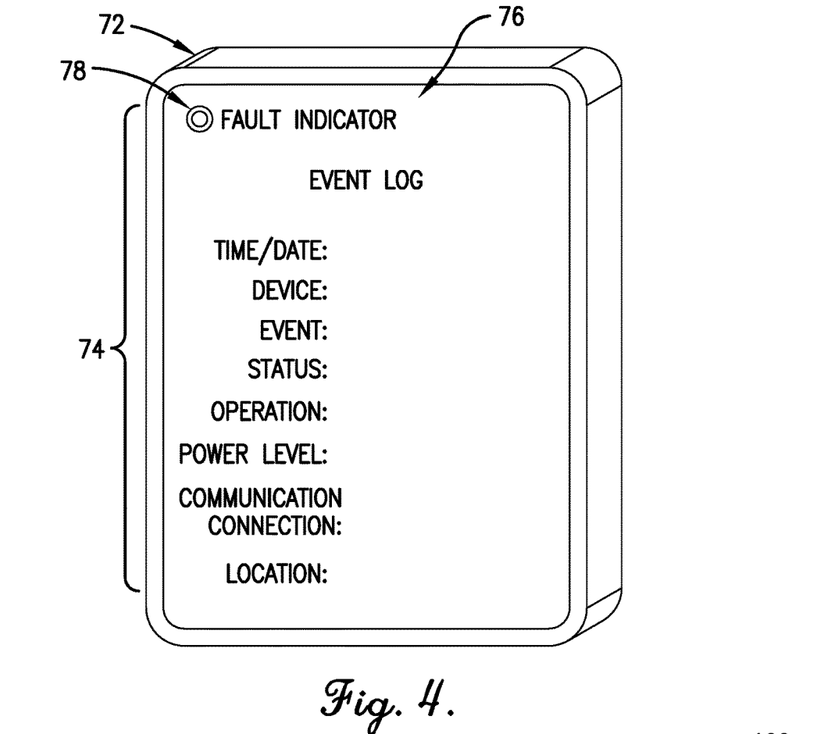
FIG. 4 is a perspective view of a display of the irrigation control panel of FIG. 3 having an electrophoretic portion.

Turning to FIG. 4, the display 72 comprises an electrophoretic portion 74 configured to display an indication representative of an operating condition. The electrophoretic portion 74 may comprise electronic ink, electronic paper, an electrophoretic display, electrophoretic ink, and/or an electrowetting display. The electrophoretic portion 74 may be configured to display a single dot, a check mark, characters, codes, images, indicators, and/or the like, or combinations thereof. In some embodiments, the display 72 may include text or FIG. 76 permanently disposed on the display, and the electrophoretic portion 74 may include one or more electrophoretic pixels 78 adjacent to the permanent text or figures.

The processing element 70 may include processors, microprocessors (single-core and multi-core), microcontrollers, DSPs, field-programmable gate arrays (FPGAs), analog and/or digital application-specific integrated circuits (ASICs), or the like, or combinations thereof. The processing element 70 may generally execute, process, or run instructions, code, code segments, software, firmware, programs, applications, apps, processes, services, daemons, or the like. The processing element 70 may also include hardware components such as finite-state machines, sequential and combinational logic, and other electronic circuits that can perform the functions necessary for the operation of the current invention. The processing element 70 may be in communication with the other electronic components through serial or parallel links that include address busses, data busses, control lines, and the like.

For example, the processing element 70 of the irrigation control panel 36 may be in communication with one or more of the valves 34, the external device 37, and/or one or more of the motors 54, 56, 58, 60 as depicted in FIG. 2. The processing element 70 may be in communication with the above components via the communication element 62 and/or direct wiring. The processing element 70 of the irrigation control panel 36 may be configured to send and/or receive information to and/or from the above components. The processing element 70 of the irrigation control panel 36 may also be configured to send and/or receive commands to and/or from the above components.

The processing element 70 of the irrigation control panel 36 may be configured to determine an operating condition of the irrigation system 10. The operating condition may comprise a current and/or prior state indication, fault indication, status indication, operational information, power level indication, wireless signal strength indication, and/or irrigation system location indication. The current and/or prior indication/operating condition may include the latest information and/or the last information prior to a shut-off event.

The state indication may include the operating state that the irrigation system 10 is in, such as operating as normal, in transition between two areas, paused for irrigating, etc. The fault indication may include a short circuit fault indication, a low-voltage indication, a high-voltage indication, an over-current indication, a loss of power indication, etc. The status indication may include the status of one or more of the components of the irrigation system 10, such as the status of the valves 34, the status of one or more of the motors 54, 56, 58, 60, the status of the irrigation control panel 36, etc. The operation information may include any metric associated with the operation of the irrigation system 10, such as an amount of water distributed, an electrical measurement of one or more of the motors 54, 56, 58, 60, a temperature of one or more of the motors 54, 56, 58, 60, an electrical measurement of one or more power line from the source 13, or the like. The power level indication may include an indication of an amount of current, voltage, power, or the like received from the source 13 and/or consumed at the irrigation system 10. The wireless signal strength indication may include an indication of a connection to one or more external device 37, such as signal strength of the external device 37 at the communication element 62, or the like. The irrigation system location indication may comprise location data of the irrigation system 10, such as position data detected by the position-detecting element 66, or the like.

The processing element 70 may be configured to receive one or more signals from the components of the irrigation system 10 to determine the operating conditions and/or the irrigation system 10 may include one or more components, such as sensors or the like, that enable the processing element 70 to measure certain operational conditions itself. For example, the processing element 70 may be configured to receive a signal from a motor controller, and/or drive unit, of one or more of the motors 54, 56, 58, 60 that represents a certain operating condition.

The processing element 70 is configured to display an indication representative of one or more of the operating conditions via the electrophoretic portion 74 of the display 72. The permanent text or FIG. 76 positioned on the display 72 may include phrases such as "Fault Indicator" or "Detected Fault". The processing element 70 may be configured to direct the display 72 to cause the small area 78 of the electrophoretic portion 74 to display a dot or other figure to indicate that, for example, a fault is detected. The reverse logic may also be implemented without departing from the scope of the present invention. For example, the processing element 70 may be configured to direct the display 72 to have the small area 78 maintain a dot or other figure to indicate a fault, for example, is not detected and to remove the dot or other figure when the fault is detected. The indication representative of the operating condition may additionally or alternatively include data associated with the operating condition, such as a time and date of the detection of the operating condition, the associated device of the operating condition, a description of the event, a description of the status, the operation being implemented by the irrigation system 10, the power level, the communication strength, the location of the irrigation system 10, or the like, and/or a combination thereof. The processing element 70 may be configured to determine such data and direct the display 72 to depict the data on the electrophoretic portion 74.

In some embodiments, the processing element 70 may be configured to disconnect power from at least one of the components of the irrigation system 10. For example, the processing element 70 may be configured to disconnect one or more of the motors 54, 56, 58, 60. The processing element 70 may be configured to send a signal to a connector, such as a contact, a semiconductor switch/contact, a relay, or the like, that causes the connector to disconnect the relevant component, such as a motor, from a power source. The processing element 70 may additionally and/or alternatively direct a motor controller and/or drive unit of the motors 54, 56, 58, 60 to stop providing power to one or more of the motors 54, 56, 58, 60. In some embodiments, the processing element 70 may be configured to disconnect the control panel 36 and/or the rest of the components of the irrigation system 10 from the power source 13. Additionally or alternatively, the irrigation system 10 may be shut down by an external cause, such as a triggering of a circuit breaker, a power outage, or the like at the power source 13.

Because the processing element 70 caused the display 72 to show an indication representative of the operating condition on the electrophoretic portion 74, the indication will persist through the loss of power even when there is no power at the display 72. In other words, the powered off display 72 of the irrigation control panel 36 will provide the last operating condition shown prior to shutdown. This allows a technician to have more information to assess the irrigation system 10 prior to turning it on.

In some embodiments, the processing element 70 may be configured to update the indication on the electrophoretic portion 74. For example, the processing element 70 may be configured to update the indication of the operating condition at a certain frequency, or number of updates over a period of time. Alternatively or additionally, the processing element 70 may be configured to update the indication representative of the operating condition upon the occurrence of an event, such as a detected change in the operating condition, when an operating condition exceeds a threshold, and/or the like. The processing element 70 may also be configured to transmit one or more of the operating conditions to the external device 37 via the communication element 62.

Figure 5:
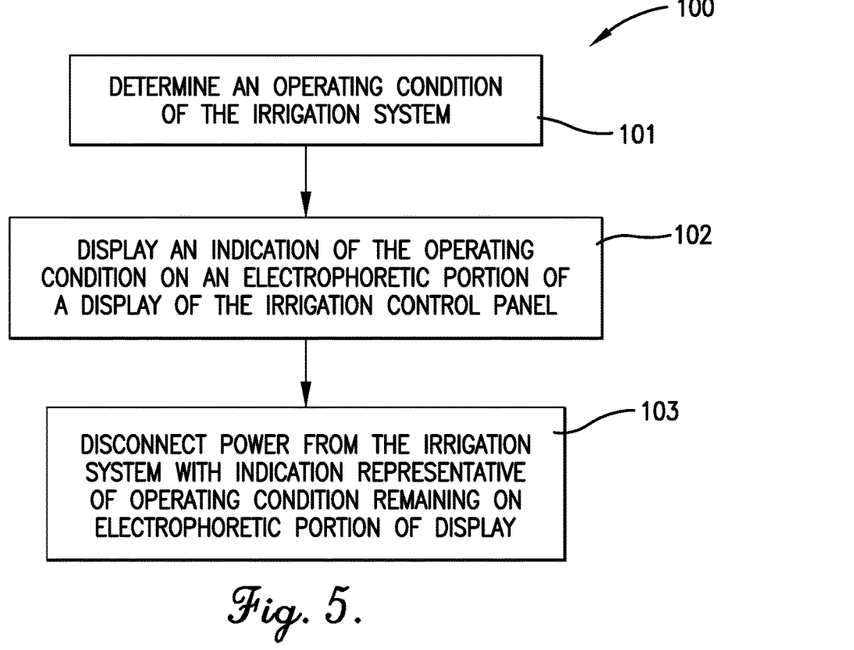
FIG. 5 is a flowchart depicting exemplary steps of a method according to an embodiment of the present invention.

The flow chart of FIG. 5 depicts the steps of an exemplary method 100 of monitoring operations of an irrigation system. In some alternative implementations, the functions noted in the various blocks may occur out of the order depicted in FIG. 5. For example, two blocks shown in succession in FIG. 5 may in fact be executed substantially concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIGS. 1-4. The steps of the method 100 may be performed by the irrigation control panel 36 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium(s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 101, an operating condition of the irrigation system is determined via a processing element of an irrigation control panel in communication with the irrigation system. The operating condition may comprise a current and/or prior state indication, fault indication, status indication, operational information, power level indication, wireless signal strength indication, and/or irrigation system location indication. The current and/or prior indication/operating condition may include the latest information and/or the last information prior to a shut-off event.

The state indication may include the operating state that the irrigation system is in, such as operating as normal, in transition between two areas, paused for irrigating, etc. The fault indication may include a short circuit fault indication, a low-voltage indication, a high-voltage indication, an over-current indication, a loss of power indication, etc. The status indication may include the status of one or more of the components of the irrigation system, such as the status of valves, the status of one or more of motors, the status of the irrigation control panel, etc. The operation information may include any metric associated with the operation of the irrigation system, such as an amount of water distributed, an electrical measurement of one or more of the motors, a temperature of one or more of the motors, an electrical measurement of one or more power line or power source, or the like. The power level indication may include an indication of an amount of current, voltage, power, or the like received and/or used at the irrigation system. The wireless signal strength indication may include an indication of a connection to one or more external device, such as signal strength of the external device at a communication element of the irrigation control panel, or the like. The irrigation system location indication may comprise location data of the irrigation system, such as position data detected by a position-detecting element of the irrigation control panel, or the like.

This step may include receiving one or more signals from the components of the irrigation system to determine the operating conditions via the processing element. This step may additionally or alternatively include receiving signals from one or more components, such as sensors or the like, and measuring certain operational conditions via the processing element based at least in part on the received signals. For example, this step may include receiving a signal from a motor controller, and/or drive unit, of one or more of the motors that represents a certain operating condition.

Referring to step 102, an indication representative of the operating condition is displayed via an electrophoretic portion of a display of the irrigation control panel. The electrophoretic portion may include electronic ink, electronic paper, an electrophoretic display, electrophoretic ink, and/or an electrowetting display. In some embodiments, the display may include text or figure permanently positioned thereon, such as "Fault Indicator" or "Detected Fault" and include a small area adjacent to the permanent text of figure comprising electrophoretic material. This step may include causing, via the processing element, the small area of the electrophoretic portion to display a dot or other figure to indicate that, for example, a fault is detected. The indication representative of the operating condition may additionally or alternatively include data associated with the operating condition, such as a time and date of the detection of the operating condition, the associated device of the operating condition, a description of the event, a description of the status, the operation being implemented by the irrigation system, the power level, the communication strength, the location of the irrigation system, or the like, and/or a combination thereof. This step may include determining, via the processing element, such data and directing the display to depict the data on the electrophoretic portion.

Referring to step 103, power may be disconnected, via the processing element, for example, from the irrigation system. For example, power to one or more of the motors of the irrigation system may be disconnected via the processing element. This step may include sending a signal, via the processing element, to a connector, such as a contact, a semiconductor switch/contact, a relay, or the like, that causes the connector to disconnect the relevant component, such as a motor, from a power source. This step may additionally and/or alternatively include directing, via the processing element, a motor controller and/or drive unit of the motors to stop providing power to one or more of the motors. In some embodiments, this step may include shutting disconnecting the irrigation control panel from the power source. Additionally or alternatively, this step may include shutting down the irrigation system, via a power control element or external cause, such as a triggering of a circuit breaker, a power outage, or the like. Because the indication representative of the operating condition is displayed on the electrophoretic portion, the indication will persist through the loss of power even when there is no power at the display. In other words, the powered off display of the irrigation control panel will provide the last operating condition shown prior to shutdown. This allows a technician to have more information to assess the irrigation system prior to turning it on.

This step may include updating, via the processing element, the indication on the electrophoretic portion. The indication may be updated periodically, continuously, and/or upon a triggering event. For example, the indication of the operating condition may be updated, via the processing element, at a certain frequency, or number of times over a period of time. Alternatively or additionally, the indication representative of the operating condition may be updated, via the processing element, upon the occurrence of an event, such as a detected change in the operating condition, when an operating condition exceeds a threshold, and/or the like.

The method 100 may include additional, less, or alternate steps and/or device(s), including those discussed elsewhere herein. For example, one or more of the operating conditions may be transmitted, via the communication element, to an external device.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An irrigation control panel for monitoring operations of a mobile irrigation system having a plurality of motors, the irrigation control panel comprising:
 a display comprising an electrophoretic portion; and
 a processing element in communication with the display and the mobile irrigation system, the processing element being configured to—
  display a current operating state indication representative of a current operating state of the mobile irrigation system on the electrophoretic portion so that the current operating state indication displayed on the electrophoretic portion persists after disconnecting power, the current operating state including at least one of a movement of the mobile irrigation system or a pause in movement of the mobile irrigation system,
  automatically update the current operating state indication on the electrophoretic portion at a preconfigured frequency,
  determine a fault condition of one or more of the plurality of motors of the mobile irrigation system, the fault condition comprising at least one of a short circuit fault indication, a low-voltage indication, a high-voltage indication, an over-current indication, a loss of power indication, a limit switch indication, or an operational fault indication, and
  display a fault indication representative of the fault condition on the electrophoretic portion so that the fault indication representative of the fault condition displayed on the electrophoretic portion persists after disconnecting power.

2. The irrigation control panel of claim 1, wherein the electrophoretic portion comprises at least one of electronic ink, electronic paper, an electrophoretic display, electrophoretic ink, or an electrowetting display.

3. The irrigation control panel of claim 1, wherein the current operating state indication displayed on the electrophoretic portion comprises at least one of a state indication, a fault indication, a status indication, a previous operational information, a power level indication, an indication of a wireless signal strength, or an indication of a location of the mobile irrigation system.

4. The irrigation control panel of claim 1, wherein the electrophoretic portion comprises a screen operable to display at least one of characters, codes, images, or indicators.

5. The irrigation control panel of claim 4, wherein the processing element is configured display characters comprising text describing the fault condition via the electrophoretic portion of the display.

6. The irrigation control panel of claim 1, wherein the processing element is in communication with one or more motor of the mobile irrigation system and is configured to receive a signal representative of an operating condition of the one or more motor and display the operating condition of the one or more motor on the electrophoretic portion of the display.

7. The irrigation control panel of claim 1, wherein the wherein the processing element is in communication with one or more valve of the mobile irrigation system and is configured to receive a signal representative of an operating condition of the one or more valve and display the operating condition of the one or more valve on the electrophoretic portion of the display.

8. The irrigation control panel of claim 1, wherein the processing element is in communication with one or more fault indicator monitoring a power line of the mobile irrigation system and is configured to receive a signal representative of an operating condition of the power line from the fault indicator and display the operating condition of the power line on the electrophoretic portion of the display.

9. The irrigation control panel of claim 1, further comprising a communication element in communication with the processing element, wherein the processing element is configured to direct the communication element to wirelessly transmit a signal representative of the fault condition.

10. The irrigation control panel of claim 1, wherein the display is mounted on the mobile irrigation system.

11. A computer-implemented method of monitoring operations of a mobile irrigation system having a plurality of motors, the computer-implemented method comprising:
displaying, via an electrophoretic portion of a display of an irrigation control panel, a current operating state indication representative of a current operating state of the mobile irrigation system on the electrophoretic portion so that the current operating state indication displayed on the electrophoretic portion persists after disconnecting power, the current operating state including at least one of a movement of the mobile irrigation system or a pause in movement of the mobile irrigation system;
automatically updating, via a processing element of the irrigation control panel in communication with the mobile irrigation system, the current operating state indication on the electrophoretic portion at a preconfigured frequency;
determining, via the processing element of the irrigation control panel in communication with the mobile irrigation system, a fault condition of one or more of the plurality of motors of the mobile irrigation system, the fault condition comprising at least one of a short circuit fault indication, a low-voltage indication, a high-voltage indication, an over-current indication, a loss of power indication, a limit switch indication, or an operational fault indication; and
displaying, via the electrophoretic portion of the display of the irrigation control panel, a fault indication representative of the fault condition so that the fault indication representative of the fault condition displayed on the electrophoretic portion persists after disconnecting power.

12. The computer-implemented method of claim 11, wherein the current operating state indication displayed on the electrophoretic portion comprises at least one of a state indication, a fault indication, a status indication, a previous operational information, a power level indication, an indication of a wireless signal strength, or an indication of a location of the mobile irrigation system.

13. The computer-implemented method of claim 11, wherein displaying, via the electrophoretic portion, the current operating state indication and the fault indication comprises displaying at least one of characters, codes, images, or indicators on the electrophoretic portion of the display.

14. An irrigation system comprising:
a plurality of mobile support towers configured to move across a field and having motors;
a plurality of truss sections extending between the mobile support towers;
a fluid-carrying conduit supported above the field by the plurality of truss sections;
water emitters coupled with the fluid-carrying conduit;
at least one valve for controlling flow of fluids through the water emitters; and
an irrigation control panel in communication with the at least one valve and the motor, the irrigation control panel comprising—
a display comprising an electrophoretic portion, and
a processing element configured to—
display a current operating state indication representative of a current operating state of the irrigation system on the electrophoretic portion so that the current operating state indication displayed on the electrophoretic portion persists after disconnecting power, the current operating state including at least one of a movement of the irrigation system or a pause in movement of the irrigation system,
automatically update the current operating state indication on the electrophoretic portion at a preconfigured frequency,
determine a fault condition of one or more of the motors of the plurality of mobile support towers, the fault condition comprising at least one of a short circuit fault indication, a low-voltage indication, a high-voltage indication, an over-current indication, a loss of power indication, a limit switch indication, or an operational fault indication, and
display a fault indication representative of the fault condition via the electrophoretic portion so that the fault indication representative of the fault condition displayed on the electrophoretic portion persists after a loss of power to the irrigation system.

15. The irrigation system of claim 14, wherein the current operating state indication displayed on the electrophoretic portion comprises at least one of a state indication, a fault indication, a status indication, a previous operational information, a power level indication, an indication of a wireless signal strength, or an indication of a location of the irrigation system.

16. The irrigation system of claim 14, wherein the electrophoretic portion comprises a screen operable to display at least one of characters, codes, images, or indicators.

17. The irrigation system of claim 15, wherein the processing element is configured display characters comprising text describing the fault condition via the electrophoretic portion of the display.

18. The irrigation system of claim 14, wherein the current operating state indication comprises at least one of a state of the motors, a last status of the motors, a fault associated with the motors, a state of the valve, a last status of the valve, or a fault associated with the valve.

\* \* \* \* \*